US 8,582,879 B2

(12) United States Patent
Kuboyama

(10) Patent No.: US 8,582,879 B2
(45) Date of Patent: Nov. 12, 2013

(54) IMAGE PROCESSING DEVICE AND IMAGE PROCESSING METHOD THAT CONVERT COLOR IMAGE INTO MONOCHROME IMAGE

(75) Inventor: Shouichi Kuboyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/414,993

(22) Filed: Mar. 8, 2012

(65) Prior Publication Data

US 2012/0237121 A1 Sep. 20, 2012

(30) Foreign Application Priority Data

Mar. 18, 2011 (JP) ................................ 2011-061010

(51) Int. Cl.
*G06K 9/00* (2006.01)
*G06K 9/34* (2006.01)

(52) U.S. Cl.
USPC .......................................... 382/167; 382/163

(58) Field of Classification Search
USPC ......... 382/162–167, 190; 358/3.01, 515, 518, 358/523, 525, 530, 534; 345/589, 590, 345/600–604
See application file for complete search history.

(56) References Cited

U.S. PATENT DOCUMENTS

| | | | | |
|---|---|---|---|---|
| 4,942,460 A | * | 7/1990 | Inagaki et al. | 358/534 |
| 5,072,305 A | * | 12/1991 | Numakura et al. | 358/3.01 |
| 5,453,853 A | * | 9/1995 | Sakai et al. | 358/518 |
| 6,035,059 A | * | 3/2000 | Kurosawa et al. | 382/164 |
| 7,692,816 B2 | * | 4/2010 | Kawamoto et al. | 358/1.9 |
| 8,237,937 B2 | * | 8/2012 | Sugiyama et al. | 358/1.13 |
| 2005/0069197 A1 | * | 3/2005 | de Queiroz et al. | 382/162 |
| 2012/0237121 A1 | * | 9/2012 | Kuboyama | 382/163 |

FOREIGN PATENT DOCUMENTS

JP 2001-16459 1/2001

* cited by examiner

*Primary Examiner* — Amir Alavi
(74) *Attorney, Agent, or Firm* — Staas & Halsey LLP

(57) ABSTRACT

An image processing device includes: a separating unit configured to separate colors of a plurality of pixels included in an input color image into a plurality of color groups on the basis of similarities between the colors of the pixels; and a conversion unit configured to generate a monochrome image by performing correction on each of the pixels of the color image on the basis of a grayscale representation assigned to each of plurality of the color groups.

20 Claims, 11 Drawing Sheets

FIG. 9A
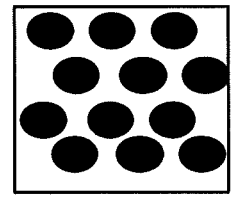
HALFTONE DOT AREA
RATIO: HIGH
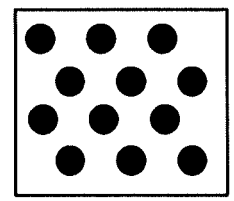
HALFTONE DOT AREA
RATIO: LOW
FIG. 9B
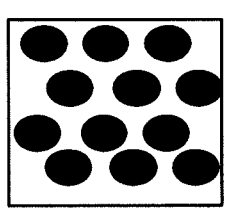
NUMBER OF LINES:
SMALL
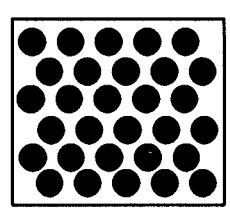
NUMBER OF LINES:
LARGE
FIG. 9C
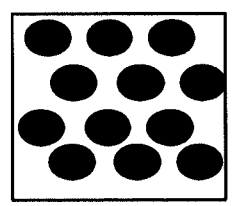
SHAPE OF PATTERN:
ELLIPSE
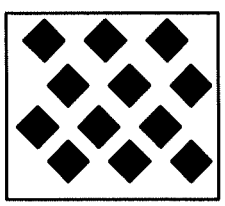
SHAPE OF PATTERN:
DIAMOND
FIG. 9D
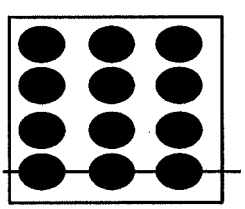
PATTERN ANGLE θ = 0°
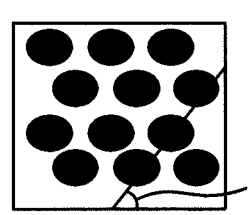
PATTERN ANGLE θ = 45°
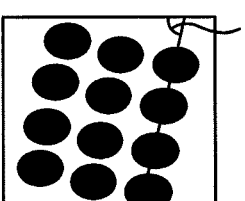
PATTERN ANGLE θ = 75°
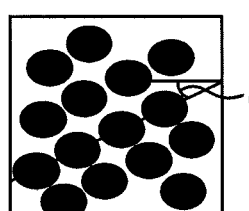
PATTERN ANGLE θ = 15°

| LIST NUMBER | REPRESENTATIVE COLOR | NUMBER OF PIXELS | COLOR DIFFERENCE | COLOR INFORMATION |
|---|---|---|---|---|
| 001 | R0,G0,B0 | 2 | C1(PIXEL 1), C2(PIXEL 2) | R1,G1,B1(PIXEL 1), R2,G2,B2(PIXEL 2) |
| ... | ... | ... | ... | ... |

IMAGE PROCESSING DEVICE AND IMAGE PROCESSING METHOD THAT CONVERT COLOR IMAGE INTO MONOCHROME IMAGE

CROSS-REFERENCE TO RELATED APPLICATION

This application is based upon and claims the benefit of priority of the prior Japanese Patent Application No. 2011-61010, filed on Mar. 18, 2011, the entire contents of which are incorporated herein by reference.

FIELD

The embodiments discussed herein are related to an image processing device, an image processing method, and a storage medium for storing an image processing program.

BACKGROUND

In general, in order to convert a color image into a monochrome image, the brightness of each of the pixels of the monochrome image is determined on the basis of each of the pixels of the color image. For example, according to a technique described in Japanese Laid-open Patent Publication No. 2001-16459, RGB signals in an RGB color space are converted into LHC signals in an LHC space. The converted LHC signals are subjected to color tuning and are re-converted into RGB signals. Thereafter, each of the RGB signals is converted into a monochrome signal Y using the conversion equation "Y=0.3R+0.6G+0.1B" and is output.

SUMMARY

According to an aspect of the invention, an image processing device includes: a separating unit configured to separate colors of a plurality of pixels included in an input color image into a plurality of color groups on the basis of similarities between the colors of the pixels; and a conversion unit configured to generate a monochrome image by performing correction on each of the pixels of the color image on the basis of a grayscale representation assigned to each of the plurality of the color groups.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 9A to 9D illustrate examples of the image of a screen pattern;

FIG. 11 illustrates an example of data stored in a pixel list.

DESCRIPTION OF EMBODIMENTS

When the brightness of each of the pixels of a monochrome image is determined using the brightness of a corresponding pixel of a color image, pixels of the color image having the same brightness may be converted into pixels of the monochrome image having the same brightness even when the colors of the pixels of the color image differs from one another. For example, let L denote the brightness of a pixel of a monochrome image. Then, L is computed as the average brightness of three colors R, G, and B of the pixel in a color image using an RGB color space. Accordingly, the average brightness is computed as follows:

$$L=(R+G+B)/3.$$

In such a case, the brightness values L of the pixels of the monochrome image become the same even when the pixels of the color image have different colors. For example, in the case of a red pixel (R=255, G=0, B=0), the brightness L=(255+0+0)/3=85. In the case of a green pixel (R=0, G=255, B=0), the brightness L=(0+255+0)/3=85. In the case of a blue pixel (R=0, G=0, B=255), the brightness L=(0+0+255)/3=85.

In addition, when the above-described equation "Y=0.3R+0.6G+0.1B" or other conversion equations are used, pixels having the same brightness defined by the conversion equation in a color image have the same brightness in the monochrome image even when the colors of the pixels in the color image differ from one another. Therefore, a difference in color in a color image before conversion is not perceivable in the monochrome image after conversion. Thus, the visibility of the monochrome image disadvantageously decreases.

Accordingly, the present technology provides an image processing device, an image processing method, and a storage medium for storing an image processing program that convert a color image into a monochrome image that allows a difference in color in the color image to be perceivable.

Embodiments of the present technology are described in detail below with reference to the accompanying drawings. Note that the embodiments below are mainly described with reference to an image process performed on a color image including a natural image region. However, the image process according to the embodiments is applicable to a color image that does not include a natural image region. In addition, in the embodiments described below, the term "color value" or "density" is also referred to as "brightness". In addition, the embodiments may be combined and performed if the consistency of the combination is preserved.

First Embodiment

Figure 1:
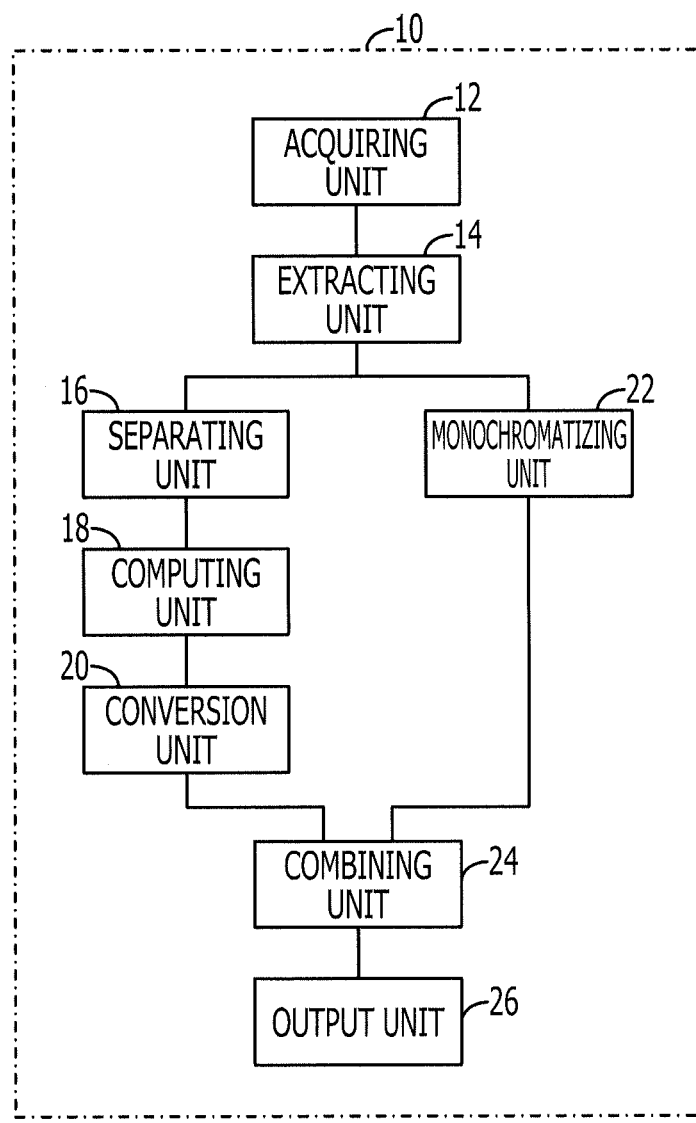
FIG. 1 is a functional block diagram of an image processing device according to an embodiment.

FIG. 1 is a functional block diagram of an image processing device 10 according to a first embodiment. The image processing device 10 converts a color image into a monochrome image. Note that the term "monochrome image" refers to an image that represents a difference in gray scale using a difference in brightness of a single color. The image processing device 10 includes an acquiring unit 12, an extracting unit 14, a separating unit 16, a computing unit 18, a conversion unit 20, a monochromatizing unit 22, a combining unit 24, and an output unit 26.

Figure 2:
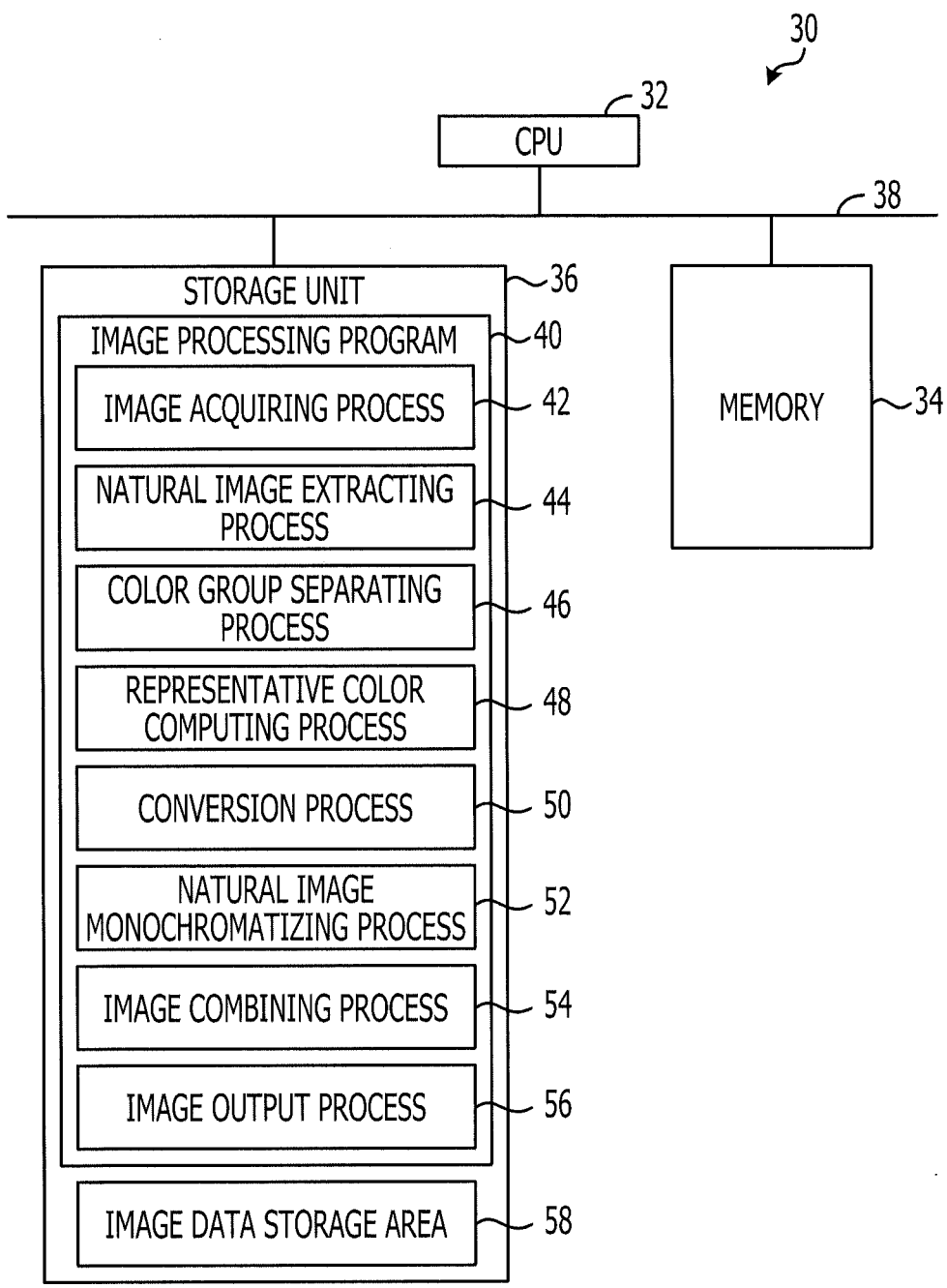
FIG. 2 is a block diagram of a computer serving as the image processing device.

The image processing device 10 may be achieved by using, for example, a computer 30 illustrated in FIG. 2. The computer 30 includes a central processing unit (CPU) 32, a memory 34, and a nonvolatile storage unit 36, which are connected to one another via a bus 38. Note that examples of the memory 34 include a random access memory (RAM) and a read only memory (ROM). The storage unit 36 may be formed from, for example, a hard disk drive (HDD) or a flash memory.

In addition, the computer 30 has an input unit (not illustrated) connected thereto via the bus 38. When a user operates the input unit, the input unit sends information in accordance with the type of operation to the CPU 32. Examples of the input unit include a keyboard and a mouse. In addition, the computer 30 has an output unit connected thereto via the bus 38. The output unit outputs a result of processing performed by the computer 30. Examples of the output unit include a display unit and a printing unit. Furthermore, the computer 30 has a network interface (not illustrated) connected thereto via the bus 38. The network interface manages data exchanged with another computer wired or wirelessly. Still furthermore, the computer 30 may have a media drive unit (not illustrated) connected thereto via the bus 38. The media drive unit reads and writes data from and to a removable recording medium.

The storage unit 36 serving as a recording medium stores an image processing program 40. The image processing program 40 causes the computer 30 to function as the image processing device 10. The storage unit 36 has an image data storage area 58 for storing the image data of a color image to be processed by the image processing device 10. The CPU 32 reads the image processing program 40 out of the storage unit 36 and loads the image processing program 40 into the memory 34. Thereafter, the CPU 32 sequentially executes the processes of the image processing program 40.

The image processing program 40 includes an image acquiring process 42, a natural image extracting process 44, a color group separating process 46, a representative color computing process 48, a conversion process 50, a natural image monochromatizing process 52, an image combining process 54, and an image output process 56. The CPU 32 functions as the acquiring unit 12 illustrated in FIG. 1 by performing the image acquiring process 42. In addition, the CPU 32 functions as the extracting unit 14 illustrated in FIG. 1 by performing the natural image extracting process 44. The CPU 32 functions as the separating unit 16 illustrated in FIG. 1 by performing the color group separating process 46. The CPU 32 functions as the computing unit 18 illustrated in FIG. 1 by performing the representative color computing process 48. Furthermore, the CPU 32 functions as the conversion unit 20 illustrated in FIG. 1 by performing the conversion process 50. The CPU 32 functions as the monochromatizing unit 22 illustrated in FIG. 1 by performing the natural image monochromatizing process 52. Still furthermore, the CPU 32 functions as the combining unit 24 illustrated in FIG. 1 by performing the image combining process 54. Yet still furthermore, the CPU 32 functions as the output unit 26 illustrated in FIG. 1 by performing the image output process 56.

When the image processing device 10 is realized by using the computer 30, the computer 30 that executes the image processing program 40 functions as the image processing device 10. While the present embodiment has been described with reference to the image processing program 40 read from the storage unit 36, the image processing program 40 may be read from any type of storage medium, such as a CD-ROM or a DVD-ROM, and be executed. The storage medium to store the image processing program does not include a transitory medium such as a propagation signal. In addition, the image processing device 10 may be formed from, for example, a semiconductor integrated circuit and, more particularly, an application specific integrated circuit (ASIC). In this case, the functional units of the image processing device 10 may be realized using, for example, electronic circuits.

The acquiring unit 12 acquires the image data of a color image to be processed by the image processing device 10. For example, the acquiring unit 12 acquires the image data by reading the image data of the color image to be processed from the image data storage area 58 of the storage unit 36. Alternatively, the acquiring unit 12 may be a document reading unit, such as a scanner, disposed outside the image processing device 10 or a communication unit that acquires the image data by communicating with an external image processing device having a storage unit storing image data. Still alternatively, the acquiring unit 12 may be formed from an application interface that receives data from an application that generates an image. Note that the acquiring unit 12 formed from a communication unit is used when, for example, the computer 30 serving as the image processing device 10 is connected to the above-described external document reading unit or image processing device via a local area network (LAN).

Note that examples of a color image to be monochromatized according to the present embodiment include a color image generated by an application program running on the computer 30 or a different computer (e.g., an illustration or a graph) and a text image using a plurality of colors for the characters. Thus, according to the present embodiment, the image processing device 10 processes a human-made color image or an image partially including a human-made color image. Note that an image to be processed may be an image having a natural image region (e.g., a photo image region) disposed outside a human-made color image region. A typical example of such an image is an image obtained by scanning a document generated by combining characters and images. The acquiring unit 12 acquires the image data of such an image as image data to be processed.

In addition, the color space of the image data of the color image acquired by the acquiring unit 12 may be any one of the following widely used color spaces: an RGB color space, a CMYK color space, an L*a*b* color space, an XYZ color space. In the following description, as an example, the image data in an RGB color space is acquired by the acquiring unit 12.

The extracting unit 14 separates the color image to be processed and represented by the image data acquired by the acquiring unit 12 into a natural image region and a region other than the natural image. More specifically, the color image to be processed is separated into a plurality of unit images first. Subsequently, the color distribution of the colors of the pixels included in each of the unit areas is obtained. Thereafter, the extracting unit 14 computes an evaluation value for evaluating the degree of non-uniformity of the color distribution for each of the unit regions. Note that, for example, the size of a distribution range obtained when the colors of the pixels in the unit region are plotted on a color coordinates may be used as the evaluation value. That is, for example, if the color coordinates are two-dimensional, the area of the distribution range may be used. Alternatively, if the color coordinates are three-dimensional, the volume of the distribution range may be used. However, any other evaluation value may be used.

Subsequently, the evaluation value computed for each of the unit areas is compared with a reference value. In this way, it is determined that each of the unit areas is the region of a natural image or the region of an image other than a natural image using the result of comparison. In general, a natural image includes pixels of various colors. That is, the non-uniformity of the distribution of each of the colors is small. Accordingly, if the evaluation value indicates a small non-uniformity of the color distribution (e.g., if an evaluation value indicating the above-described size of the distribution range is greater than or equal to a reference value), it may be determined that the target unit region is a region corresponding to a natural image. However, if the evaluation value indicates a large non-uniformity of the color distribution (e.g., if an evaluation value indicating the above-described size of the distribution range is less than the reference value), it may be determined that the target unit region is a region other than a natural image region, that is, a human-made image region. Thereafter, neighboring unit regions both corresponding to natural images are combined into one region. In addition, neighboring unit regions both corresponding to images other than a natural image are combined into one region. In this way, the color image to be processed is separated into a natural image region and a non-natural image region. If each of the unit areas of the color image to be processed has information indicating whether the region is a photo (i.e., a natural image) or a human-made image as attribute information, the color image may be separated into a natural image region and a non-natural image region by referring to the attribute information. Note that the extracting unit 14 serves as an example of an extracting unit according to the present technology.

The extracting unit 14 outputs color image data corresponding to a natural image region of the color image to be processed to the monochromatizing unit 22. The monochromatizing unit 22 converts data indicating the color of each of the pixels among color image data corresponding to the natural image region input from the extracting unit 14 into data indicating the density of the pixel. That is, the monochromatizing unit 22 converts the color image data of the natural image region into monochrome image data. For example, in order to convert the color image data into the monochrome image data, the monochromatizing unit 22 computes a color-value component of each of the pixels of the unconverted color image data. Thereafter, the density of the pixel in a monochrome image is determined by using the computed color-value component. At that time, one of widely used processing techniques may be applied.

More specifically, for example, the color space of the color image data may be converted from an RGB color space into an L*a*b* color space and, thereafter, a process for computing the density value of each of the pixels of monochrome image data from a color value L* of the pixel subjected to the conversion may be applied. Alternatively, for example, an average value of the R, G, and B values (i.e., (R+G+B)/3) may be computed for each of the pixels and, thereafter, the computed value may be used as the density value of the pixel in the monochrome image data. Still alternatively, the R, G, B values may be multiplied by different coefficients and be summed (i.e., r·R+g·G+b·B where r, g, and b are coefficients) for each of the pixels. The computed value may be used as the density value of the pixel of monochrome image data. Yet still alternatively, the weighted average of the R, G, and B values may be used. The monochromatizing unit 22 outputs, to the combining unit 24, the monochrome image data of the natural image region obtained through the above-described process.

In addition, the extracting unit 14 outputs, to the separating unit 16, the color image data of the image region other than the natural image region of the color image to be processed. The separating unit 16 separates the color distribution of the pixels of the non-natural image region input from the extracting unit 14 into a plurality of color groups (described in more detail below). The computing unit 18 computes a representative color for each of the separated color groups. The conversion unit 20 determines the density assigned to each of the color groups on the basis of the representative color computed for the color group. Thereafter, the conversion unit 20 makes the density of each of the pixels of the non-natural image region the same as the density assigned to the color group that includes the pixel. This operation corresponds to a conversion process described below. Thereafter, the conversion unit 20 outputs, to the combining unit 24, the monochrome image data of the non-natural image region obtained through the above-described process.

The combining unit 24 combines the monochrome image data of the natural image region input from the monochromatizing unit 22 with the monochrome image data of the non-natural image region input from the conversion unit 20 into the image data of a single monochrome image. Thereafter, the combining unit 24 outputs the combined monochrome image data to the output unit 26.

The output unit 26 outputs a monochrome image indicated by the image data input from the combining unit 24 so that the image is viewable by the user. An example of such a process is a process in which the image data is output to a printing apparatus that prints an image on a sheet of paper and the printing apparatus prints, on a sheet of paper, a monochrome image indicated by the input image data. If the image processing device 10 is included in a printing apparatus, another example of such a process is a process in which the output unit 26 instructs a printing unit of the printing apparatus to print the monochrome image. The printing apparatus may be a widely used type of printing apparatus, such an electrophotographic printing apparatus, an inkjet printing apparatus, or a press plate printing apparatus. Alternatively, the image data may be output to a display apparatus that displays an image on a screen, and a monochrome image represented by the input image data may be displayed on the screen of the display apparatus.

The operation of the first embodiment is described next. In existing techniques, in order to monochromatize a color image, as in the processing performed by the monochromatizing unit 22, the color-value component of each of the pixels is computed from the color of the pixel of the unconverted image, and a process for determining the density of the pixel of the monochrome image from the computed color-value component is performed. In a natural image, the colors of neighboring pixels are rarely the same. In general, the colors of the pixels differ from each other. Accordingly, in a general monochromatizing process for a natural image, even when some pixels having different colors in the original color image are reproduced as pixels having the same density in the converted monochrome image, the impact on the image quality of the monochrome image is small. Thus, as a whole, the reproducibility of the original color image is high.

In contrast, in a human-made color image (e.g., a color image of an illustration or a graph or a text image using a plurality of colors for characters), areas each having a certain color (i.e., a region in which pixels of the same color are continuously arranged) are scattered throughout the image. That is, a human-made color image has a non-uniform color distribution. If an existing monochromatizing process is applied to such an image, portions of the original color image having different colors may be reproduced as portions of a converted monochrome image having the same density. That is, such phenomenon occurs for each of the areas of the original color image having a certain color. Thus, if two areas that have different colors in the original color image and are reproduced as areas having the same density in the monochrome image converted from the original color image neighbor each other, it is difficult to distinguish between the two areas of the converted monochrome image as the areas having different colors in the original color image.

For example, assume that normal characters in text are colored using a first color, characters of a specific portion of the text are colored using a second color, and an image including the text image is monochromatized. In this case, if the brightness (the color value) of the first color significantly differs from that of the second color, the characters of the first color are reproduced as characters having a different density from that of the characters of the first color in the converted monochrome image even when an existing monochromatizing process is applied to the text image. However, when an existing monochromatizing process is applied to the text image and if the brightness of the first color is the same as or close to the second color, the characters of the first color and the characters of the second color in the original text image are reproduced with the same density or close densities in the converted monochrome image. Accordingly, in the converted monochrome image, it is significantly difficult to distinguish the characters of the first color in the original text image from the characters of the second color in the original text image.

In addition, for example, assume that a first region of a graph is colored with a first color, a second region different from the first region is colored with a second color different from the first color, and an image including the graph is monochromatized. In this case, like the above-described colors in text, if an existing monochromatizing process is applied, the first color and the second color are represented as the same density or close densities in the monochrome image. For example, it is difficult to distinguish neighboring first and second regions of a bar graph or a circle graph from each other. While the above description has been made with reference to a bar graph or a circle graph, the type of graph is not limited thereto. For example, even when a graph having line portions of different colors, such as a line graph, is used, the same problem arises.

Therefore, according to the present embodiment, in a monochromatizing process, an image region of a color image that has a non-uniform color distribution is monochromatized using the separating unit 16, the computing unit 18, and the conversion unit 20 as follows.

Figure 3:
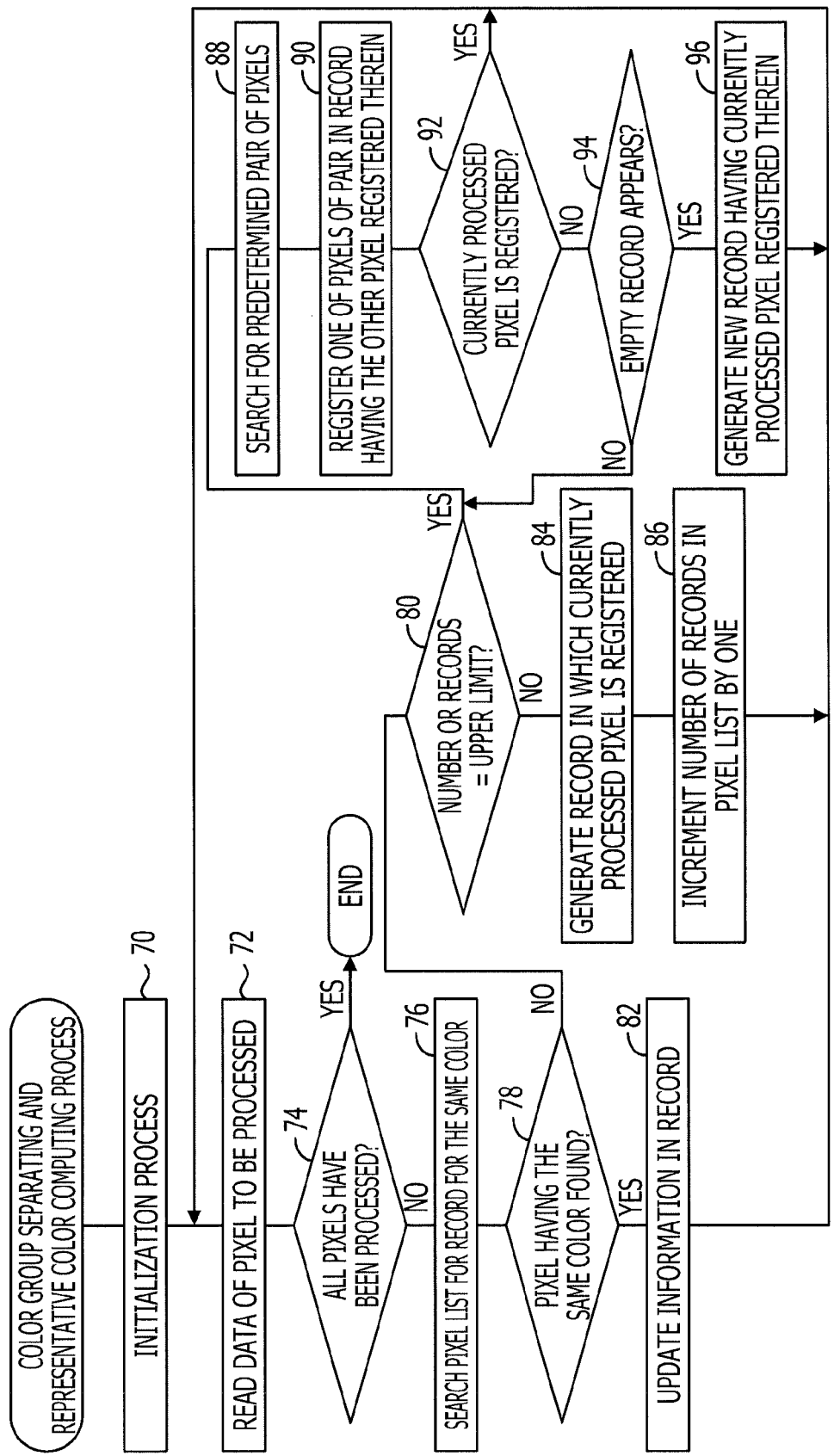
FIG. 3 is a flowchart of a color group separating and representative color computing process.

A color group separating and representative color computing process performed by the separating unit 16 and the computing unit 18 is described first with reference to FIG. 3. As described above, the extracting unit 14 outputs, to the separating unit 16, the color image data of a non-natural image region of a color image to be processed. Accordingly, the color image data input to the separating unit 16 by the extracting unit 14 is the color image data of an image region other than a natural image region. In the color group separating and representative color computing process illustrated in FIG. 3, the separating unit 16 clears the storage area of a pixel list (described in more detail below) in the storage area of the memory 34. Thus, an initialization process in which the storage area of the pixel list having m records in the memory 34 is set to 0 is performed (process 70). Subsequently, the separating unit 16 attempts to read the data of a pixel to be processed from the color image data input from the extracting unit 14 (process 72). Thereafter, the separating unit 16 determines whether all of the pixels of the color image data have been processed (process 74). If all of the pixels of the color image data have already been read and, therefore, the extracting unit 14 fails to read a new pixel in process 72, the determination is "Yes". Thereafter, if, in process 74, the determination is "Yes", the color group separating and representative color computing process is completed.

However, if, in process 72, the data of a new pixel to be processed may be read, the determination made in process 74 is "No". Thereafter, the separating unit 16 determines whether the information regarding a pixel having a color within a color difference range in which the color may be regarded as the same as the color of the currently processed pixel has been registered (process 76). In this embodiment, the color difference range in which the color may be regarded as the same as the color of the currently processed pixel is set in advance or is set by the user in the form of a parameter used when the process is performed. For example, a threshold value indicating the distance between the pixels in the color space or the sum of absolute values between the pixel value components is set, and if the color difference is less than or equal to the threshold distance or the threshold sum, the two pixel values may be regarded as the same value.

Subsequently, the separating unit 16 determines whether the information regarding a pixel having a color within a color difference range in which the color may be regarded as the same as the color of the currently processed pixel may be extracted in process 76 (process 78). Note that when the image region is processed and if the data of a first pixel in the image region is read as a pixel to be processed, no record is present in the pixel list. That is, the determination made in process 78 is "No". If the determination in process 78 is "No", the separating unit 16 determines whether the number of the records in the pixel list stored in the memory 34 reaches a certain upper limit (process 80).

When the data of the first pixel is read as data to be processed, the number m of the records in the pixel list is 0 and, therefore, the determination made in process 80 is "No". If the determination made in process 80 is "No", the separating unit 16 generates a new record for the currently processed pixel that is to be registered (process 84).

An example of the data stored in the pixel list is illustrated in FIG. 11. The pixel list 200 includes a record 201 having fields in which information items "list number", "representative color", "number of pixels", "color difference", and "color information" are registered. The field "list number" contains the sequence number of the record in the pixel list. The field "representative color" contains the pixel value indicating, for example, the average color of all of the pixels registered in the record. The field "number of pixels" contains the number of pixels registered in the record. For example, in the record 201, two pixels "Pixel 1" and "Pixel 2" are registered. Accordingly, the field "number of pixels" contains "2".

The term "color difference" refers to information indicating a color difference between the pixel value of one of the pixels recorded in the record and the pixel value indicated by the information "representative color". For example, in the record 201, a color difference "C1" between the pixel value of Pixel 1 and the representative color and a color difference "C2" between the pixel value of Pixel 2 and the representative color are registered. The term "color information" refers to the pixel value of a pixel registered in the record. For example, in the record 201, the pixel value "R1, G1, B1" of Pixel 1 and the pixel value "R2, G2, B2" of Pixel 2 are registered.

When the separating unit 16 generates a new record in the pixel list, the new record has "number of pixels" set to 1, "representative color" and "color information" each set to the color information regarding of the currently processed pixel. Thereafter, the separating unit 16 increments the number m of the records stored in the memory 34 by one (process 86). After the process 86 has been completed, the processing returns to process 72, where the separating unit 16 reads the data of a new pixel as the data of a pixel to be processed. Subsequently, the above-described processing is repeated.

However, if the currently processed pixel has a color that is the same as the color of the previously processed pixel in the color group separating process, the information regarding the pixel having the same color as that of the currently processed pixel is extracted in process 76 ("Yes" in process 78). In such a case, the separating unit 16 and the computing unit 18 additionally registers the information regarding the currently processed pixel in the record of the pixel list in which the information regarding the pixel having the same color extracted in process 76 (process 82) has been registered.

More specifically, the separating unit 16 increments "number of pixels" in the record by one and additionally registers the color information regarding the currently processed pixel in the field "color information". In addition, using the color information regarding a plurality of pixels registered in the "color information" field of the record, the computing unit 18 computes a new representative color and updates the "representative color" into the new computed representative color. Furthermore, the computing unit 18 computes the color difference between the new representative color and the color of each of the pixels registered in the "color information" field. Thereafter, the "color difference" in the record is updated into the computed color differences.

Note that for example, as the representative color, the average color for each of the color components R, G, and B of all of the pixels registered in a record may be employed. Alternatively, a color computed using another computing method may be used (e.g., the color corresponding to the centroid point of the distribution range in the color coordinates of all of the pixels in the record). In addition, for example, as the color difference between the representative color and the color of each of the pixels, a color difference $\Delta C$ (a difference between the representative color and the color of each of the pixels in the color coordinates) computed by using the following equation (1) may be used:

$$\Delta C = \sqrt{((R_i - R_0))^2 + (G_i - G_0)^2 + (B_i - B_0)^2)} \quad (1)$$

where $R_i$, $G_i$, $B_i$ denote the values of the color components of each of the pixels, and $R_0$, $G_0$, $B_0$ denote the values of the color components of the representative color. Still alternatively, a color computed using another computing method may be used. After the above-described process 82 has been completed, the processing returns to process 72, where the separating unit 16 reads the data of a new pixel as the data of a pixel to be processed. Thereafter, the above-described processing is repeated.

The data is sequentially read through the above-described processing until the number m of the records in the pixel list reaches the upper limit. Thus, among the pixels to be processed, the pixels having the same color are registered in the same record. However, the pixels having different colors are registered in different records. If the number m of the records reaches the upper limit, the determination made in operation 80 is "Yes" and, thus, the processing proceeds to process 88.

In such a case, the separating unit 16 searches a set of the pixels that has been processed before the current time and the pixels registered in the pixel list for a pair of pixels registered in different records and having a minimum color difference (process 88). That is, the plurality of pixels that have been processed before the current time include the pixel that is currently processed and the pixels having the information registered in the pixel list. If a pair of pixels that satisfies the condition is extracted, the separating unit 16 and the computing unit 18 register, in the record for one of the two pixels having the information registered in the record, the information regarding the other pixel (process 90).

Note that if one of the two pixels is the currently processed pixel read in process 72, the information regarding the currently processed pixel is additionally registered in the record of the pixel list including the information of the other pixel in process 90 as in the above-described process 82.

If the two pixels have already been registered in the pixel list, the information regarding one of the pixels is moved into the record of the pixel list including the information of the other pixel in process 90. In this case, the information regarding either one of the pixels may be moved. However, it is desirable that the information of the pixel registered in the record having the smaller value in the field "number of pixels" be moved. This is because the number of loops from process 88 to process 94 is reduced and, therefore, the processing time is highly likely reduced.

In order to move the information regarding the pixel that has already been registered in the pixel list, the separating unit 16 performs the above-described additional registration process described in process 82. In addition, the separating unit 16 deletes the information regarding the moved pixel from the field "color information" of the record of the pixel list and updates the "number of pixels". Furthermore, the computing unit 18 updates the "representative color" and deletes the information in the "color difference" field of the record of the pixel list including the information regarding the moved pixel.

Subsequently, the separating unit 16 determines whether the information regarding the pixel that is read in operation 72 and that is currently processed has been registered in any one of the records of the pixel list (process 92). If the determination is "No", the separating unit 16 determines whether a record having a "number of pixels" of 0, that is, an empty record appears in the pixel list (process 94). If the determination is "No", the processing returns to process 88. Thereafter, processes 88 to 94 are repeated until the information regarding the currently processed pixel is registered in any one of the records of the pixel list or until the record for registering the information regarding the currently processed pixel may be generated in the pixel list.

If the information regarding the currently processed pixel is registered in any one of the records of the pixel list, the determination made in process 92 is "No" and, therefore, the processing returns to process 72. However, if an empty record appears, the determination made in process 94 is "Yes" and, therefore, the separating unit 16 generates a new record in which the currently processed pixel is registered in the pixel list (process 96). Thereafter, the processing returns to process 72.

Figure 4A:
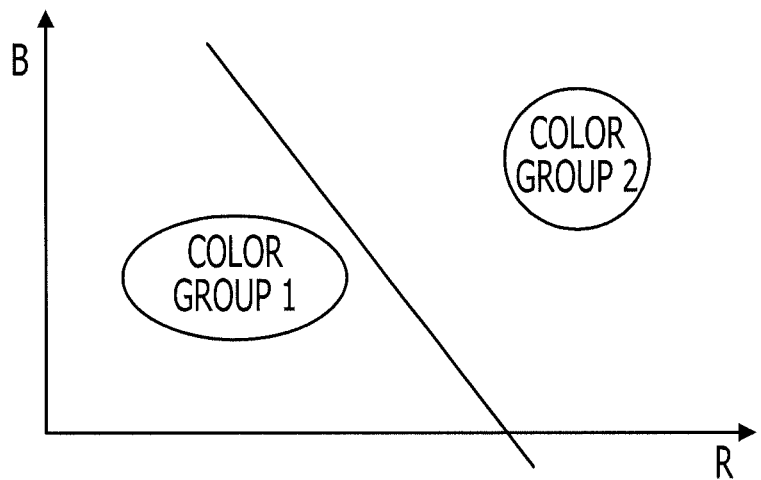
FIGS. 4A and 4B are schematic illustrations of an example of a result of a group dividing process.
Figure 4B:
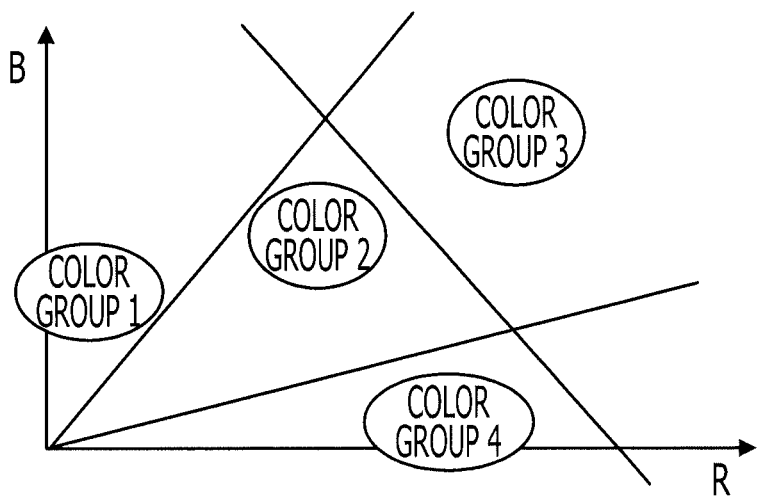

The above-described processing is repeated until the determination made in process 74 becomes "Yes". Accordingly, when, for example, the upper limit of the number m of the records in the pixel list is 2, two records or one record is generated. The information regarding each of the pixels is registered in one of the two records or one record. In this way, the color distribution of the pixels in the image region indicated by the image data input from the extracting unit 14 is separated into two color groups having the information registered in the different records of the pixel list, as illustrated an image in FIG. 4A. In the image illustrated in FIG. 4A, the abscissa indicates the R value of a pixel while the ordinate indicates the B value of the pixel. Alternatively, when, for example, the upper limit of the number m of the records in the pixel list is 4, a maximum of four records are generated. The information regarding each of the pixels is registered in one of the maximum of four records. In this way, the color distribution of the pixels in the image region indicated by the color image data input from the extracting unit 14 is separated into four color groups having the information registered in the different records of the pixel list, as illustrated in FIG. 4B. In the image illustrated in FIG. 4B, the abscissa indicates the R value of a pixel while the ordinate indicates the B value of the pixel.

Note that each of the color groups includes at least one pixel. Let at least one pixel form a pixel group corresponding to a color group. Then, a pixel group included in a color group may be scattered in the screen data, may be lumped and located at a plurality of sub-areas, or may be lumped and located inside of one sub-area. The location of a pixel group corresponding to a color group in the screen data is determined by, for example, the XY coordinates of each of the pixels in the screen data.

The conversion process performed by the conversion unit 20 is described in detail next with reference to FIG. 5. Note that as described above, the conversion unit 20 determines the density to be assigned to each of the color groups on the basis of the representative color of the color group computed by the computing unit 18. Thereafter, the conversion unit 20 makes the density of each of the pixels in a non-natural image region the same as the density assigned to the color group including the pixel.

Figure 5:
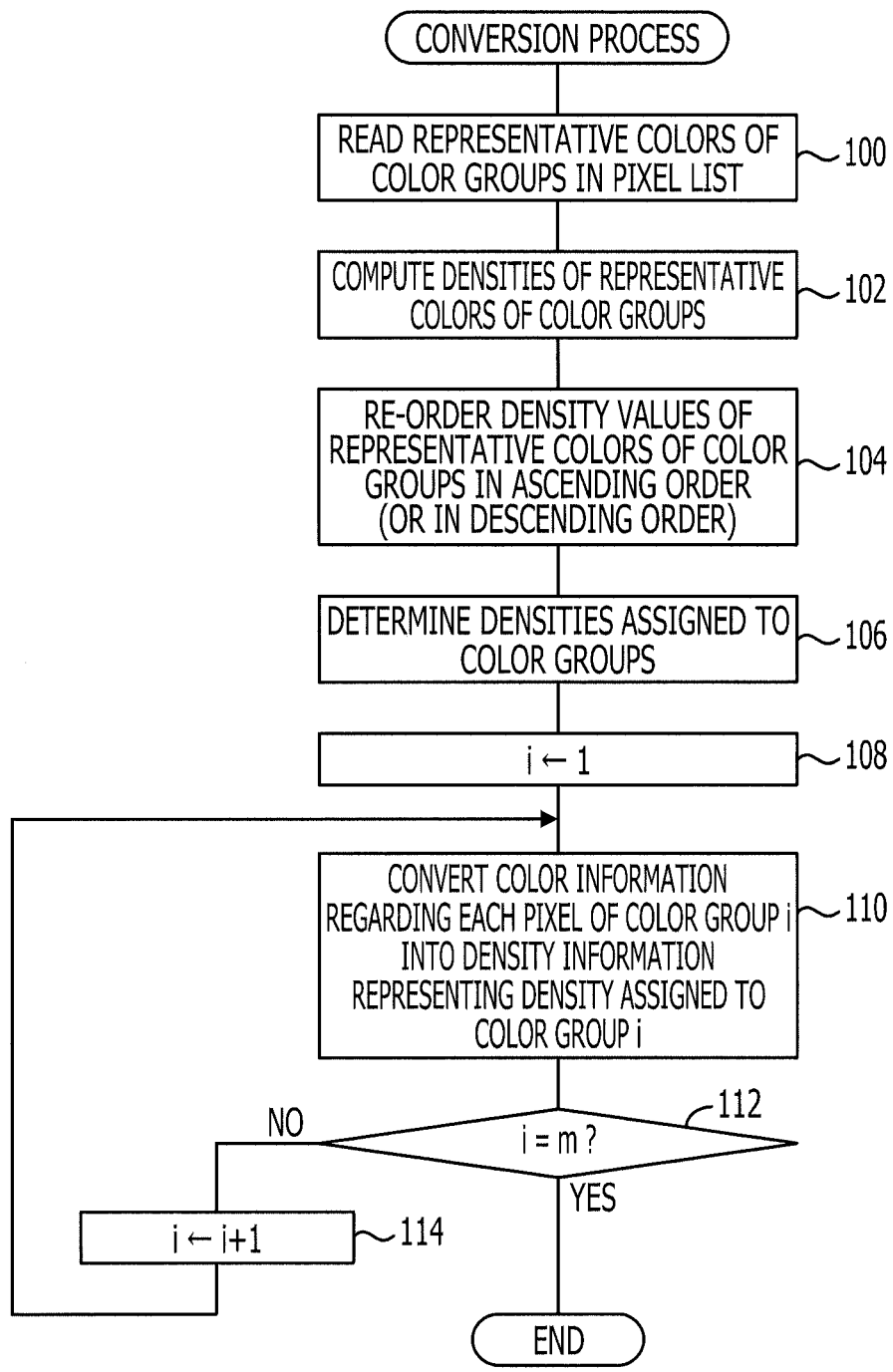
FIG. 5 is a flowchart of a conversion process according to a first embodiment.

In the conversion process illustrated in FIG. 5, the conversion unit 20 sequentially reads the representative color information regarding each of the color groups from each of the records of the pixel list first (process 100). Subsequently, the conversion unit 20 computes the density for the representative color of each of the color groups on the basis of the representative color information read in process 100 (process 102).

Figure 6:
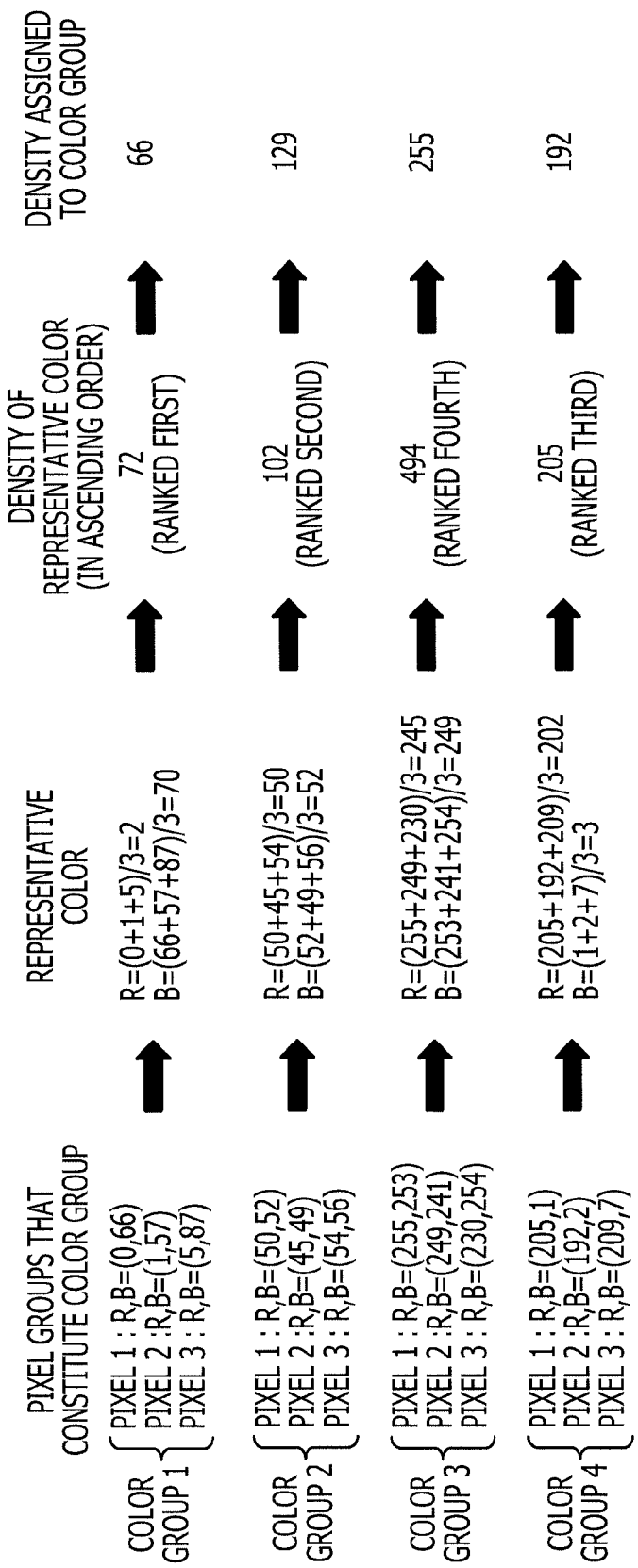
FIG. 6 is a schematic illustration of an example of the flow of the conversion process according to the first embodiment.

Note that according to the present embodiment, the densities for the representative colors are used for ranking the densities of the color groups. Accordingly, a density of the representative color that is roughly computed is sufficient. FIG. 6 is a schematic illustration of an example of the flow of the conversion process according to the first embodiment. As illustrated in FIG. 6, the sum of some of the R, G, and B values of the representative color (e.g., the sum of the R and B values) may be used. In the example illustrated in FIG. 6, for a color group 1, the representative color is determined by $R_0=2$ and $B_0=70$. The sum of the values (=72) is used as the density of the representative color. For a color group 2, the representative color is determined by $R_0=50$ and $B_0=52$. The sum of the values (=102) is used as the density of the representative color. In addition, for a color group 3, the representative color is determined by $R_0=245$ and $B_0=294$. The sum of the values (=494) is used as the density of the representative color. For a color group 4, the representative color is determined by $R_0=202$ and $B_0=3$. The sum of the values (=205) is used as the density of the representative color. However, the sum of the R, G, and B values of the representative color may be used. Alternatively, all or some of the R, G, and B values may be multiplied by corresponding to certain coefficients, and the sum of the products may be used.

Subsequently, the conversion unit 20 ranks the densities of the representative colors of the color groups computed in process 102 on the basis of a greater-lesser relationship of the densities of the representative colors (process 104). For example, in the example illustrated in FIG. 6, the densities of the representative colors of the color groups are ranked in the ascending order of the densities of the representative colors of the color groups. The color group 1 having the lowest density (=72) of the representative color is ranked first. The color group 2 having the second lowest density (=102) of the representative color is ranked second. The color group 4 having the second highest density (=205) of the representative color is ranked third. The color group 3 having the highest density (=494) of the representative color is ranked fourth.

Subsequently, the conversion unit 20 determines the densities to be assigned to the color groups in the monochrome image on the basis of the ranks of the densities of the representative colors of the color groups obtained through the process 104 (process 106). According to the first embodiment, the density assigned to each of the color groups is determined so that the dynamic range of the density (i.e., the difference between the highest value and the lowest value of the density) of the converted monochrome image is larger than the dynamic range of the unconverted color image.

Figure 7:
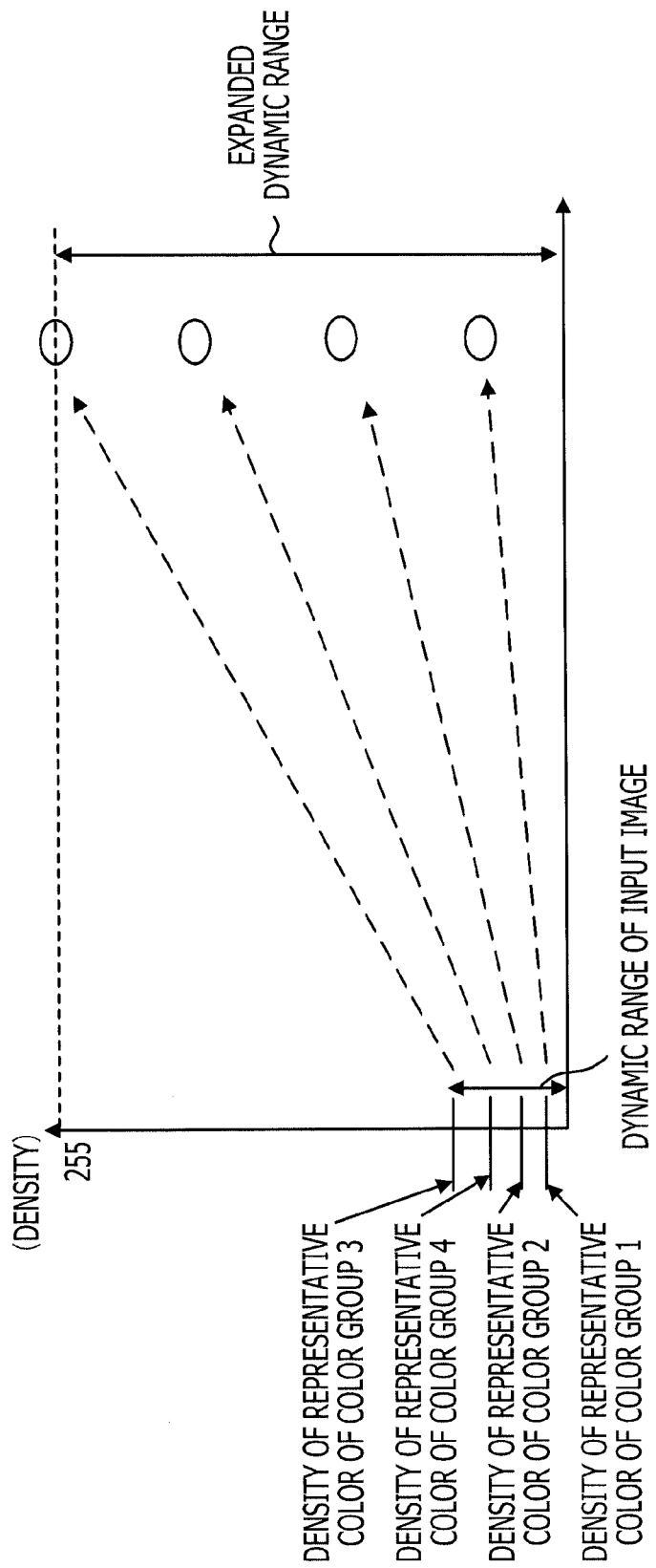
FIG. 7 illustrates an example of the density values assigned to color groups.

More specifically, the conversion unit 20 separates a numerical range between the lowest value (=0) and the highest value ($=2^n-1$) of a theoretical density, which are determined by the number of bits of the data indicating the density, into a plurality of numerical ranges in accordance with the number m of the records. Note that the numerical ranges are determined so that the difference between the widths of two numerical ranges is minimized. In the first embodiment, a monochrome image to be printed on a sheet of paper is obtained. Accordingly, the lowest value of the density (=0) is assigned to the base color of paper (white). Thus, the conversion unit 20 separates the numerical range between the lowest value and the highest value of the theoretical density into m numerical ranges, which is the number that is the same as the number of the color groups m. Thereafter, the conversion unit 20 extracts m density values corresponding to the borders between the separated numerical ranges and assigns each of the m extracted density values to one of the color groups in accordance with the ranks of densities of the representative colors of the color groups. FIG. 7 illustrates m density values corresponding to the borders between the separated numerical ranges. In FIG. 7, the ordinate represents the density. The symbol "O" on the right side of FIG. 7 indicates the determined density value of the representative color of each of the color groups. As illustrated in FIG. 7, a difference between the density values determined in process 106 and indicated by the symbols "O" on the right side of FIG. 7 is larger than a difference between the density values of the representative colors of the color groups on the left side of FIG. 7. As described above, the density values assigned to the color groups are determined so that the dynamic range of the density of the converted monochrome image is wider than the dynamic range of the density of the unconverted color image.

A specific example of determining the density assigned to each of the color group is described next. For example, if the number of bits of data indicating density is 8, the highest theoretical density is $2^8-1$ (=255). For example, when the number of the color groups is 4 and if the lowest value of the density (=0) is assigned to the base color of paper (white), the range of the density between the lowest value and the highest value is separated into 4 numerical ranges (also refer to FIG. 7). Thus, as illustrated in FIG. 6, for example, the values "66", "129", "192", and "255" assigned to the color groups are obtained. Note that in this example, the range of the density between the lowest value and the highest value is separated into 4 numerical ranges so that the widths of the separated numerical ranges (the differences between the density values assigned to the color groups) are substantially the same. By separating the range of the density so that the differences between the density values are substantially the same, the different color groups may be easily distinguished from one another in an image output as a result of the monochromatizing process.

In the example illustrated in FIG. 6, the lowest density value "66" is assigned to the color group 1 that is ranked first in the order of the density of the representative color of a color group (in the ascending order). In addition, the second lowest density value "129" is assigned to the color group 2 that is ranked second in the order of the density of the representative color of a color group (in the ascending order). Furthermore, the third lowest density value "192" is assigned to the color group 4 that is ranked third in the order of the density of the representative color of a color group (in the ascending order). Still furthermore, the highest density value "255" is assigned to the color group 3 that is ranked fourth in the order of the density of the representative color of a color group (in the ascending order).

Subsequently, the conversion unit 20 converts the color image data of the non-natural image region output from the extracting unit 14 into monochrome image data. That is, the conversion unit 20 sets a variable i to 1 (process 108). Thereafter, the conversion unit 20 converts the color information regarding each of the pixels of the color image data to be converted and included in a color group i into the density information indicating the density assigned to the color group i in process 106 (process 110). Subsequently, the conversion unit 20 determines whether the variable i reaches the number m of the records in the pixel list (i.e., the number of color groups) (process 112). If the determination is "No", the conversion unit 20 increments the variable i by one (process 114).

After the process 114 is performed, the processing returns to process 110. Thereafter, processes 110 to 114 are repeated until the determination made in process 112 becomes "Yes". If the determination made in process 112 becomes "Yes", the conversion process is completed. In this way, the color image in the non-natural image region is converted into a monochrome image in which the densities of the pixels in different color groups are different and the dynamic range of the density is increased.

Note that the brightness assigned to each of the color groups may be determined without computing the brightness of the representative color of each of the color groups and without taking into account the greater-lesser brightness relationship among the representative colors. For example, the brightness assigned to each of the color groups may be determined in accordance with the number of the color groups without using the rank of the brightness of the color group. In such a case, processes 102 and 104 are removed. If processes 102 and 104 are removed, process 106 may be performed immediately after process 100. In this case, in process 106, the brightness of each of the color groups may be determined on the basis of the order of the list number of the pixel list.

As described above, according to the first embodiment, for the color image data of a non-natural image region (i.e., the color image data having a non-uniform color distribution), the color distribution in the image region is separated into a plurality of color groups. Thereafter, different densities are assigned to the color groups in order to represent different grayscales. In this way, the areas of the original color image having different colors are reproduced as the areas of the converted monochrome image having different densities. Thus, the areas of the converted monochrome image may be easily distinguished from one another as the areas of the original color image having different colors.

For example, when a text image including characters of a first color and characters of a second color is monochromatized and if the hue of the first color differs from the hue of the second color and the color values of the first and second colors are similar to each other, the characters of the first color and the characters of the second color in the original text image are reproduced in a monochrome image using different densities. Accordingly, the areas of the original color image having different colors may be easily distinguished in the converted color image data.

In addition, according to the first embodiment, the brightness assigned to each of the color groups in a monochromatized image is determined in accordance with the brightness of each of the color groups in the color image. In this way, the visible grayscale of the monochromatized image may be made similar to the visible grayscale of the color image. Thus, visual discomfort that a user feels when the user looks at a monochrome image converted from a color image may be reduced. Furthermore, according to the first embodiment, during separation of the color distribution, the brightness assigned to each of the color groups is determined so that the differences between the brightness values are substantially the same. In this way, the color groups having different colors may be easily distinguished from one another in an image output as a result of the monochromatizing process.

Second Embodiment

Figure 8:
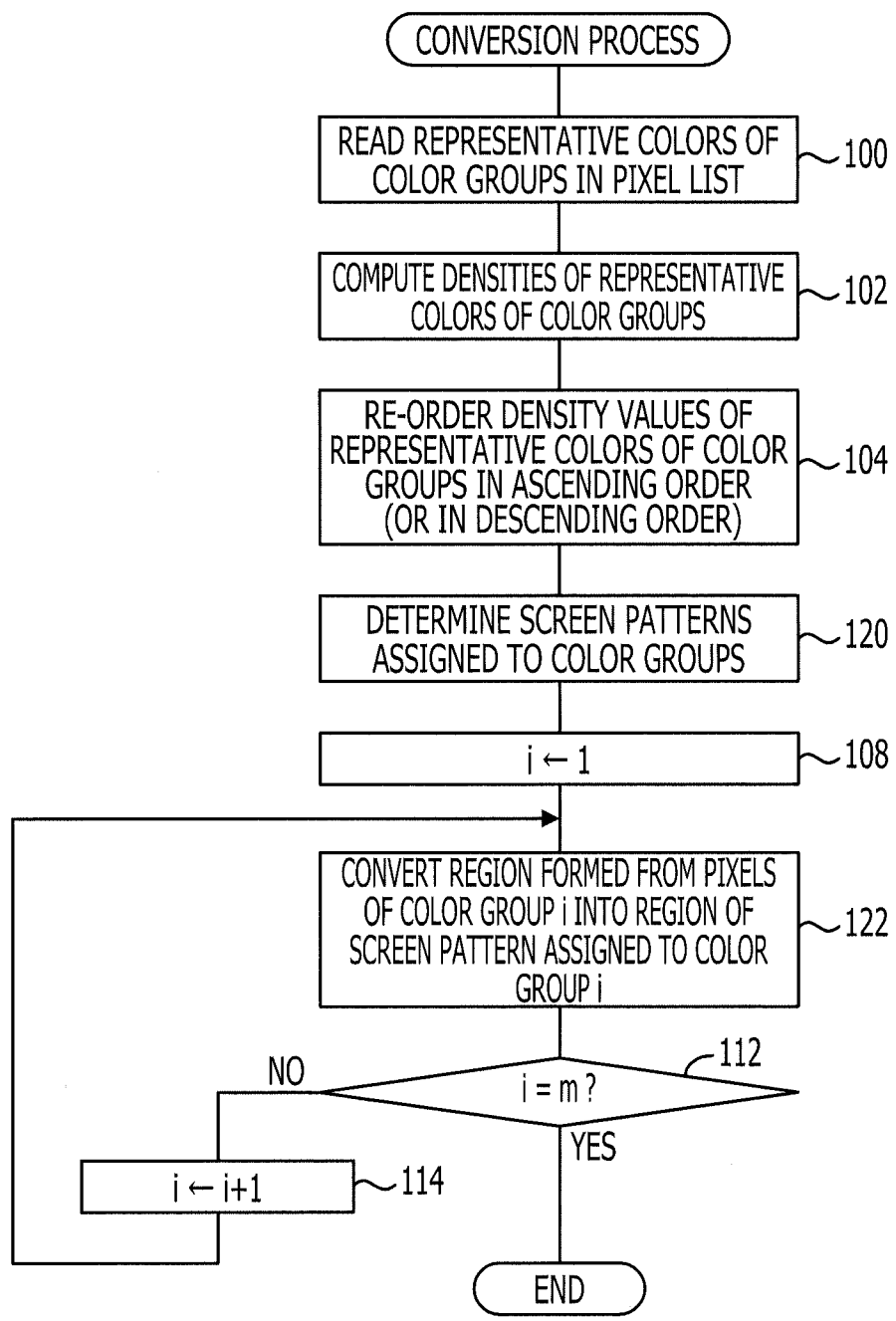
FIG. 8 is a flowchart of a conversion process according to a second embodiment.

A second embodiment of the present technology is described next. Note that the second embodiment is similar to the above-described first embodiment except for the conversion process. Accordingly, the same numbering will be used in referring to the components of the second embodiment as is utilized above in describing the first embodiment, and the description of the configuration of the second embodiment is not repeated. The conversion process according to the second embodiment is described in detail below with reference to FIG. 8.

In the conversion process according to the second embodiment, the conversion unit 20 performs the processes that are the same as processes 100 to 104 of the conversion process of the first embodiment (refer to FIG. 5). Thereafter, from among a plurality of screen patterns prestored in the storage unit 36, the conversion unit 20 selects a screen pattern to be assigned to each of the color groups in a monochrome image in accordance of the ranks of the densities of the representative colors of the color groups (process 120).

The screen pattern is selected so that the screen patterns assigned to the color groups are distinguished from one another in the monochrome image. For example, according to the present embodiment, halftone dots applicable to the screen pattern are based on a technique for representing the grayscale in a binary image by varying the area ratio for a unit region. In general, the area ratio or the number of the lines of the halftone dots, the shape of the pattern, and the angle of the pattern arrangement is selected in accordance with, for example, the output resolution or the output grayscale. According to the present embodiment, by varying at least one of the area ratio, the number of the lines of the halftone dots, the shape of the pattern, and the angle of the pattern arrangement, the screen patterns may be distinguished from one another in a monochrome image.

FIGS. 9A to 9D illustrate an example of variations in the halftone dot screen pattern. If, as illustrated in FIG. 9A, the area ratio of halftone dots in the halftone dot screen pattern is varied, the regions of the monochrome image having the screen pattern are distinguished from one another as regions having different grayscale representations. Alternatively, even when, as illustrated in FIG. 9B, the number of lines of the halftone dot screen pattern is varied, the regions of the monochrome image having the screen pattern are distinguished from one other as regions having different grayscale representations. Still alternatively, even when, as illustrated in FIG. 9C, the shape of the halftone dot screen pattern is varied, the regions of the monochrome image having the screen pattern are distinguished from one another as regions having different grayscale representations. Yet still alternatively, even when, as illustrated in FIG. 9D, the angle of the halftone dot arrangement in a halftone dot screen pattern is varied, the regions of the monochrome image having the screen pattern are distinguished from one another as regions having different grayscale representations.

Accordingly, if the plurality of screen patterns stored in the storage unit 36 are halftone dot screen patterns, the conversion unit 20 selects one of the screen patterns to be assigned to each of the color groups in the monochrome image as follows. That is, the conversion unit 20 selects the screen patterns that have at least one of different halftone dot area ratios, different numbers of lines of halftone dots, different shapes of a pattern, and different angles of a pattern arrangement and that are recognized as patterns having different grayscales in the monochrome image. The number of the selected screen patterns is the same as the number of the color groups. Thereafter, the conversion unit 20 ranks the selected screen patterns using the level of grayscales represented by the screen patterns. The screen patterns are assigned to the color groups having the ranks of the densities of the representative colors that are the same as the ranks of the screen patterns. In this way, the color groups have the screen patterns assigned thereto in accordance with the ranks of the densities of the representative colors.

In addition, according to the second embodiment, the conversion unit 20 performs a process for converting a region corresponding to the pixels of a color group i into the region of the screen pattern assigned to the color group i (process 122) instead of the process for converting the color information regarding the pixels included in the color group i into the density information (process 110 illustrated in FIG. 5). The above-described processing is performed on each of the color groups and, therefore, the regions of the original color image having different colors are reproduced in the converted monochrome image as regions having different screen patterns, that is, different grayscale representations. Thus, the regions of the monochrome image having different screen patterns are recognized as the regions of the original color image having different colors.

Note that a screen pattern to be assigned to each of the color groups may be determined without computing the density of the representative color of each of the color group and without taking into account a greater-lesser brightness relationship among the densities of the representative colors. For example, the screen patterns to be assigned to the color groups may be selected in accordance with the total number of the color groups. In such a case, processes 102 and 104 are removed. If processes 102 and 104 are removed, process 120 may be performed immediately after process 100. In this case, in process 120, the screen patterns corresponding to the color groups may be determined on the basis of the order of the list number of the pixel list.

As described above, according to the second embodiment, for the color image data of a non-natural image region (i.e., the color image data having a non-uniform color distribution), the color distribution in the image region is separated into a plurality of color groups. Thereafter, different screen patterns are assigned to the color groups in order to represent different grayscales. In this way, the areas of the original color image having different colors are reproduced as the areas of the converted monochrome image having the different screen patterns. Thus, the areas of the converted monochrome image may be easily distinguished from one another as the areas of the original color image having different colors.

In addition, according to the second embodiment, during the monochromatizing process, a screen pattern assigned to each of the color groups is determined in accordance with the density of the color group in the color image. In this way, the visible grayscale of the monochromatized image may be made similar to the visible grayscale of the color image. Thus, visual discomfort that a user feels when the user looks at a monochrome image converted from a color image may be reduced.

While the first embodiment has been described with reference to an operation in which a numerical range between the lowest value and the highest value of the theoretical density determined in accordance with the number of bits of the density value is separated into the numerical ranges corresponding to the m color groups, the operation is not limited thereto. For example, if the densities of the representative colors of the color groups differ from one another by a certain value or more, the densities of the representative colors of the color groups may be directly assigned to the color groups.

In addition, while the second embodiment has been described with reference to an operation in which screen patterns that have at least one of different halftone dot area ratios, different numbers of lines of halftone dots, different shapes of a pattern, and different angles of a pattern arrangement are assigned to the color groups, the operation is not limited thereto. For example, screen patterns that have at least one of different shapes of a pattern and different angles of a pattern arrangement may be assigned to the color groups, and the halftone dot area ratio of the screen patterns assigned to the color groups may be varied in accordance with the densities of the representative colors of the color groups.

Furthermore, for example, if the color groups have the same hue but different color values, such as dark red and light read, in the original color image, a screen pattern having the same number of lines or the same pattern is assigned to the color groups having the same hue. In addition, the halftone dot area ratio may be varied in accordance with the density of the representative color of each of the color groups. By assigning the screen patterns to the color groups in this manner, the appearance of the converted monochrome image may be made more similar to the appearance of the unconverted color image. The present technology also embraces such an embodiment.

Figure 10A:
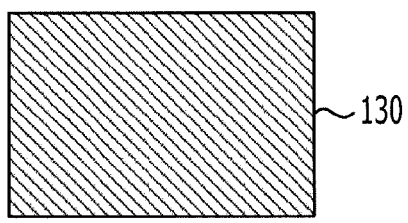
FIGS. 10A to 10F illustrate examples of the image of a screen pattern.
Figure 10B:
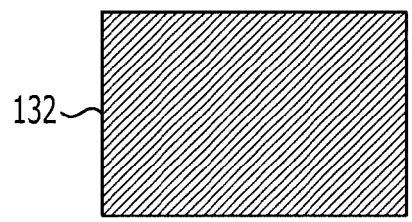
Figure 10C:
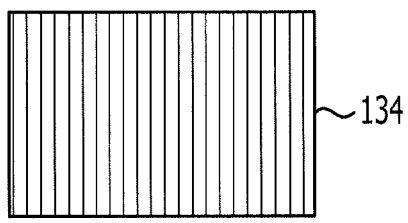
Figure 10D:
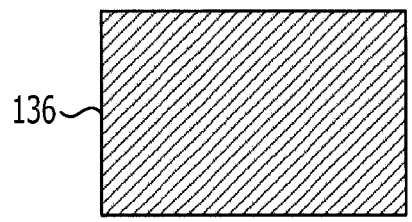
Figure 10E:
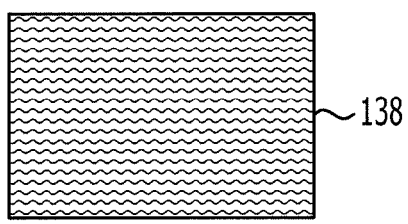
Figure 10F:
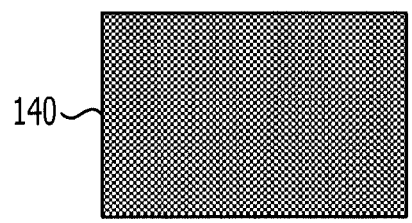

In addition, while the second embodiment has been described with reference to a halftone dot screen pattern, the present technology is not limited thereto. For example, any patterns that are recognized as different patterns in a monochrome image may be employed. Accordingly, for example, screen patterns illustrated in FIGS. 10A to 10F may be employed. A screen pattern 130 illustrated in FIG. 10A is a pattern having diagonally right down lines arranged at certain intervals. A screen pattern 132 illustrated in FIG. 10B is a pattern having diagonally right up lines arranged at certain intervals. In addition, a screen pattern 134 illustrated in FIG. 10C is a pattern having vertical lines arranged at certain intervals. A screen pattern 136 illustrated in FIG. 10D is a pattern having diagonally right up lines that are thicker than the lines of the screen pattern 132 and that are arranged at certain intervals. A screen pattern 138 illustrated in FIG. 10E is a pattern having wavy lines extending in the horizontal direction and arranged at certain intervals. A screen pattern 140 illustrated in FIG. 10F is a pattern having alternately arranged rectangular black regions and rectangular white regions.

Since the screen patterns 130 to 140 illustrated in FIGS. 10A to 10F are also recognized as different patterns in a monochrome image, these screen patterns may be stored in the storage unit 36 and, thereafter, as many of the screen patterns as the number of the color groups may be selectively used. Note that the screen patterns employed in the second embodiment are not limited to the above-described screen patterns. For example, screen patterns having different types of lines, such as solid lines, dotted lines, alternate long and short dash lines, wavy lines, and heavy lines, may be employed.

While the above-described embodiments have been described with reference to an operation in which the density of the representative color of each of the color groups is computed and the density or the screen pattern assigned to the color group is determined on the basis of a greater-lesser relationship between the computed densities, the operation is not limited thereto. For example, the present technology may embrace an embodiment in which the brightness of the representative color of each of the color groups is computed and the density or the screen pattern assigned to the color group is determined on the basis of a greater-lesser relationship among the computed brightness values.

While the above-described embodiments have been described with reference to the embodiments including the extracting unit 14, the monochromatizing unit 22, and the combining unit 24, the present technology is not limited thereto. For example, if the acquiring unit 12 acquires only color images that do not include a natural image region, the extracting unit 14, the monochromatizing unit 22, and the combining unit 24 may be removed.

Alternatively, a user may input the information indicating whether the extracting unit 14, the monochromatizing unit 22, and the combining unit 24 operate. For example, when only the mood of an overall image of graphic pattern is desired (e.g., when a ready-for-the-press plate image for checking a draft is output), the user may input an instruction to stop the operations of the extracting unit 14, the monochromatizing unit 22, and the combining unit 24. For example, if the user selects output in a high-resolution mode, the extracting unit 14, the monochromatizing unit 22, and the combining unit 24 operate. However, if the user selects output in a low-resolution mode (or a high-speed mode), the extracting unit 14, the monochromatizing unit 22, and the combining unit 24 do not operate.

If the extracting unit 14, the monochromatizing unit 22, and the combining unit 24 do not operate, a color image acquired by the acquiring unit 12 is input to the separating unit 16. The operations of the separating unit 16 and the computing unit 18 are the same as those in the first embodiment. Thereafter, the conversion unit 20 outputs the processing result to the output unit 26 instead of the combining unit 24.

While the above-described embodiments have been described with reference to the operation in which different densities are assigned to the pixel groups of the monochrome image included in different color groups and an operation in which different types of grayscale (different screen patterns) are assigned to the pixel groups of the monochrome image included in different color groups, the present technology is not limited thereto. For example, different densities and different types of grayscale may be assigned to the pixel groups of the monochrome image included in different color groups.

While the above-described embodiments have been described with reference to the processing technique in which the color distribution of the pixels is separated into a plurality of color groups by the separating unit 16 that allocates a currently processed pixel to a color group having a minimum color difference from the color of the pixel and repeats such a process for each of the pixels, the present technology is not limited thereto. Any separating unit 16 that converts a color used in a color image to be processed to a different color may be used. That is, the separating unit 16 may group the pixels having similar pixel values into the same color group on the basis of the similarity between the pixel values. For example, the pixels are plotted in the color coordinates on the basis of the values of the pixels of the image data, and the plotted pixels in a certain range are defined as a color group. That is, the pixels may be separated into color groups on the basis of the color distribution in the color coordinates. In such a case, the value indicating the certain range may be certain as described in the first embodiment. Alternatively, for example, by using the pixel values of the pixels, a histogram indicating the color distribution may be generated. The color distribution may be separated at the turning point of the generated histogram (at the point at which the frequency is minimized). Thus, the color distribution of the pixels of the image may be separated into a plurality of color groups.

In addition, the operation in process 88 may be changed as follows. That is, a pixel that is to be temporarily processed is selected from among the currently processed pixel received in operation 72 and the pixels registered in the pixel list. Thereafter, from among the representative colors registered in the pixel list, the representative color having a minimum color difference within the range in which the representative color is regarded as the color of the temporarily selected pixel may be searched for. The range in which the representative color is regarded as the color of the temporarily selected pixel may be determined as in operation 76. In such a case, in operation 90, the information regarding the pixel that is to be temporarily processed is additionally registered in the record of the pixel list in which the representative color extracted in operation 88 is registered.

If, in operation 88, the pixel that is to be temporarily processed is the currently processed pixel read in operation 72, the information regarding the pixel that is to be temporarily processed, in operation 90, is additionally registered in the record of the pixel list in which the representative color extracted in operation 88 is registered, as in the above-described operation 82. However, if, in operation 88, the pixel that is to be temporarily processed is not the currently processed pixel read in operation 72, that is, if the pixel that is to be temporarily processed is a pixel registered in the pixel list, the information regarding the pixel that is to be temporarily processed, in operation 90, is moved into the record in which the representative color extracted in operation 88 is registered.

Alternatively, for example, the color distribution of the pixels of the image may be separated into a plurality of color groups using a median cut algorithm. In the median cut algorithm, a rectangular parallelepiped that is circumscribed around the color distribution in the RGB space of the original image is defined first. Thereafter, the rectangular parallelepiped is divided such that all of the pixels of the original image are divided into two equal parts by an axis that is parallel to the longest side of the rectangular parallelepiped. By repeating such an operation, the rectangular parallelepiped is divided into small pieces. Finally, N rectangular parallelepipeds each including the same number of pixels are generated. The average of the color data items in each of the rectangular parallelepipeds is defined as a representative color. Note that the axis that divides a rectangular parallelepiped into two pieces may be an axis having the largest variance instead of the longest axis.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
   a separating unit configured to separate colors of a plurality of pixels included in an input color image into a plurality of color groups on the basis of similarities between the colors of the pixels; and
   a conversion unit configured to generate a monochrome image by performing correction on each of the pixels of the color image on the basis of a grayscale representation assigned to each of the plurality of the color groups.

2. An image processing method executed by a computer, the image processing method comprising:
   separating colors of a plurality of pixels included in an input color image into a plurality of color groups on the basis of the similarities between the colors of the pixels; and
   generating a monochrome image by performing correction on each of the pixels of the color image on the basis of a grayscale representation assigned to each of the plurality of the color groups.

3. The image processing method according to claim 2, wherein the separating is performed on the color image that does not include a natural image region.

4. The image processing method according to claim 2, wherein the separating unit puts each of the plurality of pixels included in the color image into one of the color groups so that pixels having a slight color difference therebetween are included in the color group.

5. The image processing method according to claim 2, further comprising:
   computing a representative color for each of the color groups; and
   determining the grayscale representation assigned to each of the color groups on the basis of the density of the representative color of the color group.

6. A non-transitory computer-readable storage medium storing an image processing program that causes a computer to execute:
   separating colors of a plurality of pixels included in an input color image into a plurality of color groups on the basis of the similarities between the colors of the pixels; and
   generating a monochrome image by performing correction on each of the pixels of the color image on the basis of a grayscale representation assigned to each of the plurality of the color groups.

7. The non-transitory computer-readable storage medium according to claim 6, wherein the separating involves receiving the color image that does not include a natural image region.

8. The non-transitory computer-readable storage medium according to claim 6, wherein the separating involves putting each of the plurality of pixels included in the color image into one of the color groups so that pixels having a slight color difference therebetween are included in the color group.

9. An image processing device comprising:
   a memory; and
   a processor coupled to the memory and configured to:
      separate colors of a plurality of pixels included in an input color image into a plurality of color groups on the basis of the similarities between the colors of the pixels; and
      generate a monochrome image by performing correction on each of the pixels of the color image on the basis of a grayscale representation assigned to each of plurality of the color groups.

10. The image processing device according to claim 9, wherein the processor receives the color image that does not include a natural image region.

11. The image processing device according to claim 9, wherein the processor puts each of the plurality of pixels included in the color image into one of the color groups so that pixels having a slight color difference therebetween are included in the color group.

12. The image processing device according to claim 9, wherein the processor computes a representative color for each of the color groups obtained by the separating unit; and
    determines the grayscale representation assigned to each of the color groups on the basis of the density of the representative color of the color group.

13. The image processing device according to claim 12, wherein the processor determines a ranking among the densities that indicate the grayscale representations assigned to pixel groups included in each of the color groups on the basis of the ranking among the densities of the representative colors of the color groups.

14. The image processing device according to claim 9, wherein the processor determines the density assigned to a plurality of pixels included in each of the color groups so that a difference between a maximum value and a minimum value of the density in the monochrome image is greater than that in the color image.

15. The image processing device according to claim 9, wherein the processor determines the grayscale representation assigned to each of the pixel groups in any one of the color groups on the basis of a value obtained by dividing a maximum value among the density values of the pixels by the number of the color groups.

16. The image processing device according to claim 9, wherein the processor assigns screen patterns having at least one of different area ratios, different number of lines, different patterns, and different angle of pattern arrangement to the color groups as the grayscale representation, and converts the color image into a monochrome image represented using the screen patterns assigned to the pixel groups.

17. The image processing device according to claim 9, wherein the processor separates the colors of the pixels of the input color image into a plurality of color groups, and the number of the color groups is less than the number of the colors.

18. The image processing device according to claim 9, wherein the processor separates the colors of the pixels of the input color image into a certain number of the color groups.

19. The image processing device according to claim 9, wherein the processor separates an input image into a plurality of regions, extracts a natural image region having a feature of a natural image, and inputs an image region other than the natural image region to the separating unit as the color image.

20. The image processing device according to claim 19, wherein the processor computes a level of non-uniformity of color distribution of a plurality of pixels included in each of the regions, and determines whether each of the regions is a natural image region on the basis of the level of non-uniformity.

* * * * *